Feb. 16, 1943.  G. R. TYLER  2,311,586
STIRRER FOR FOOD COOKERS
Filed Aug. 9, 1941   3 Sheets-Sheet 1

INVENTOR
GUY R. TYLER
BY
ATTORNEYS

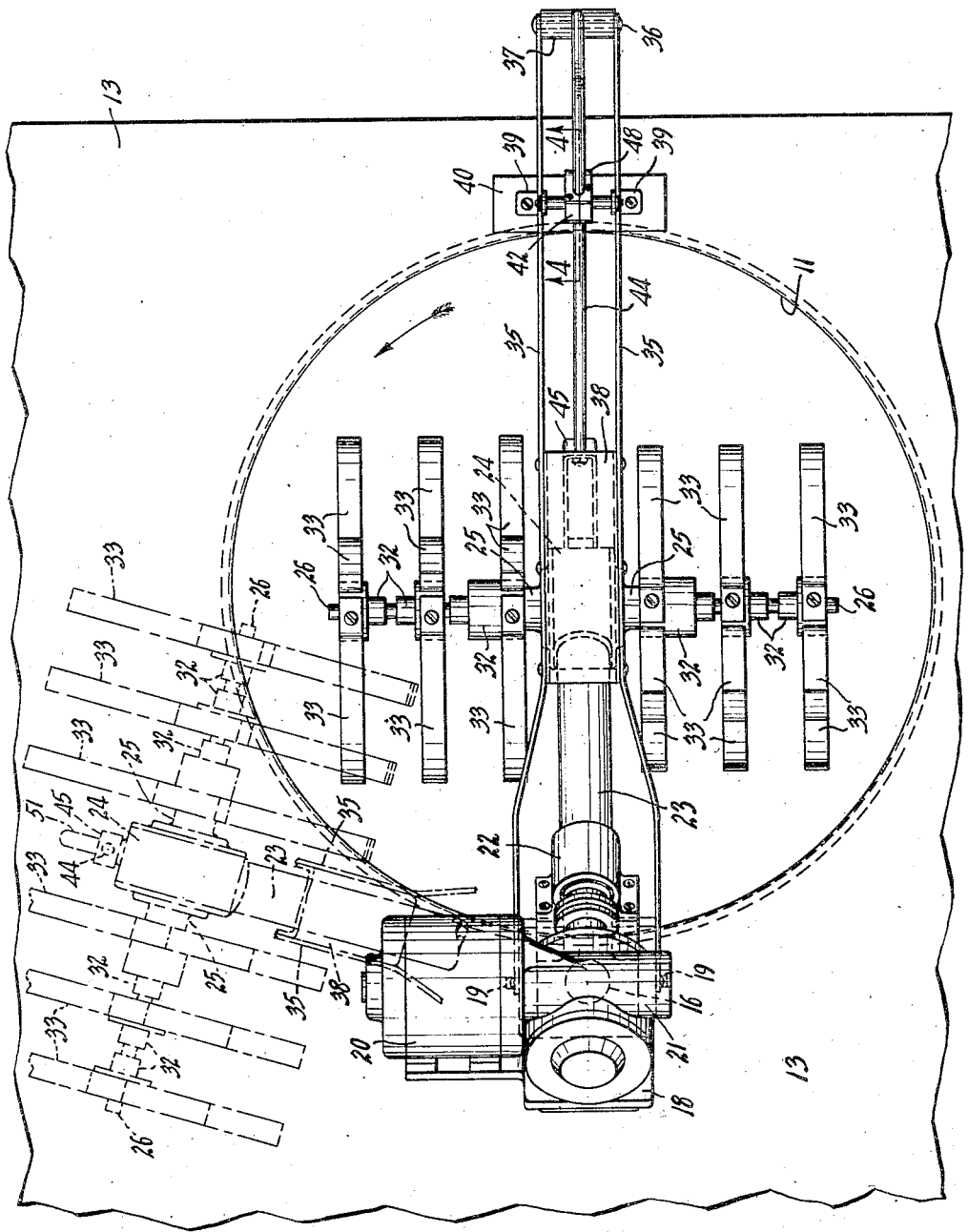

Feb. 16, 1943.  G. R. TYLER  2,311,586
STIRRER FOR FOOD COOKERS
Filed Aug. 9, 1941  3 Sheets-Sheet 3
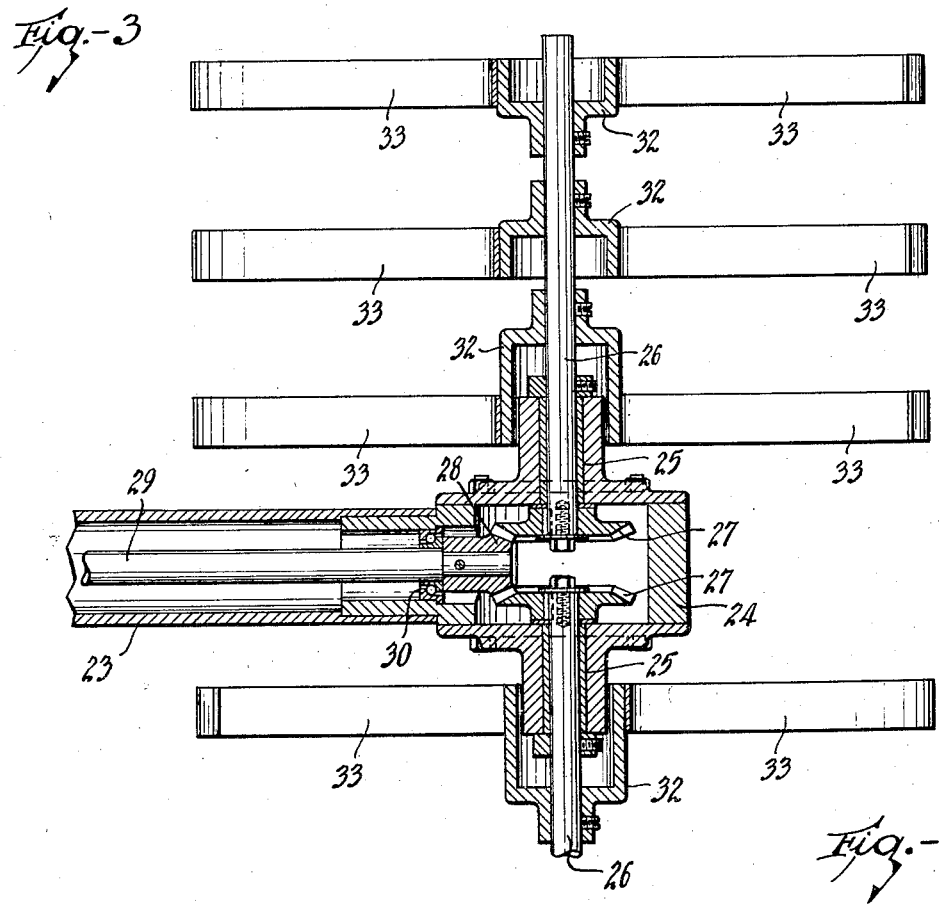
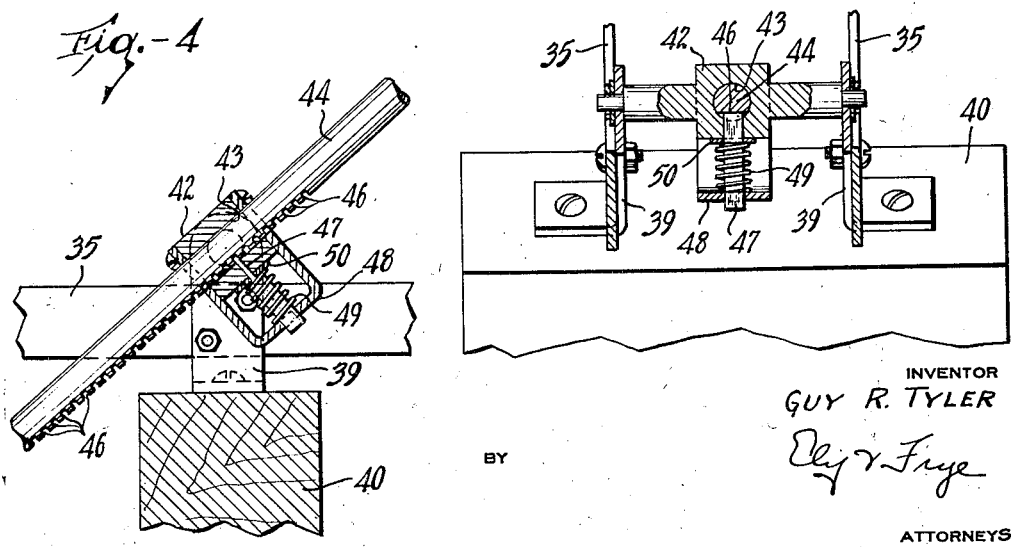
INVENTOR
GUY R. TYLER
ATTORNEYS Patented Feb. 16, 1943

2,311,586

UNITED STATES PATENT OFFICE 2,311,586

STIRRER FOR FOOD COOKERS

Guy R. Tyler, Akron, Ohio

Application August 9, 1941, Serial No. 406,148

10 Claims. (Cl. 259—129)

This invention relates to stirrers for food cookers, and more especially it relates to agitating mechanism for use with cookers designed for deep frying of food products, for example, potato chips.

The chief objects of the invention are to provide in an improved manner for the stirring of the food product being cooked, whereby uniformity of cooking is achieved; to provide in a simple manner for the positioning of the stirrer at various elevations with relation to the cooking medium; to provide in a simple manner for removing the stirrer to an inoperative position to enable the cooked food readily to be removed from the cooker; to provide a stirrer that will not break or mash fragile food units; and to provide a stirrer of the character mentioned that periodically will force the food units below the liquid level of the cooking medium, and concurrently will impel said food units in an orbital course within the cooker. Other objects will be manifest as the description proceeds.

Of the accompanying drawings:

Fig. 2 is a plan view thereof;

Fig. 3 is a fragmentary section on a larger scale on the line 3—3 of Figure 1;

Figure 4 is a section, on a larger scale, on the line 4—4 of Fig. 2; and

Fig. 5 is a section, on a larger scale, on the line 5—5 of Fig. 1.

Figure 1:
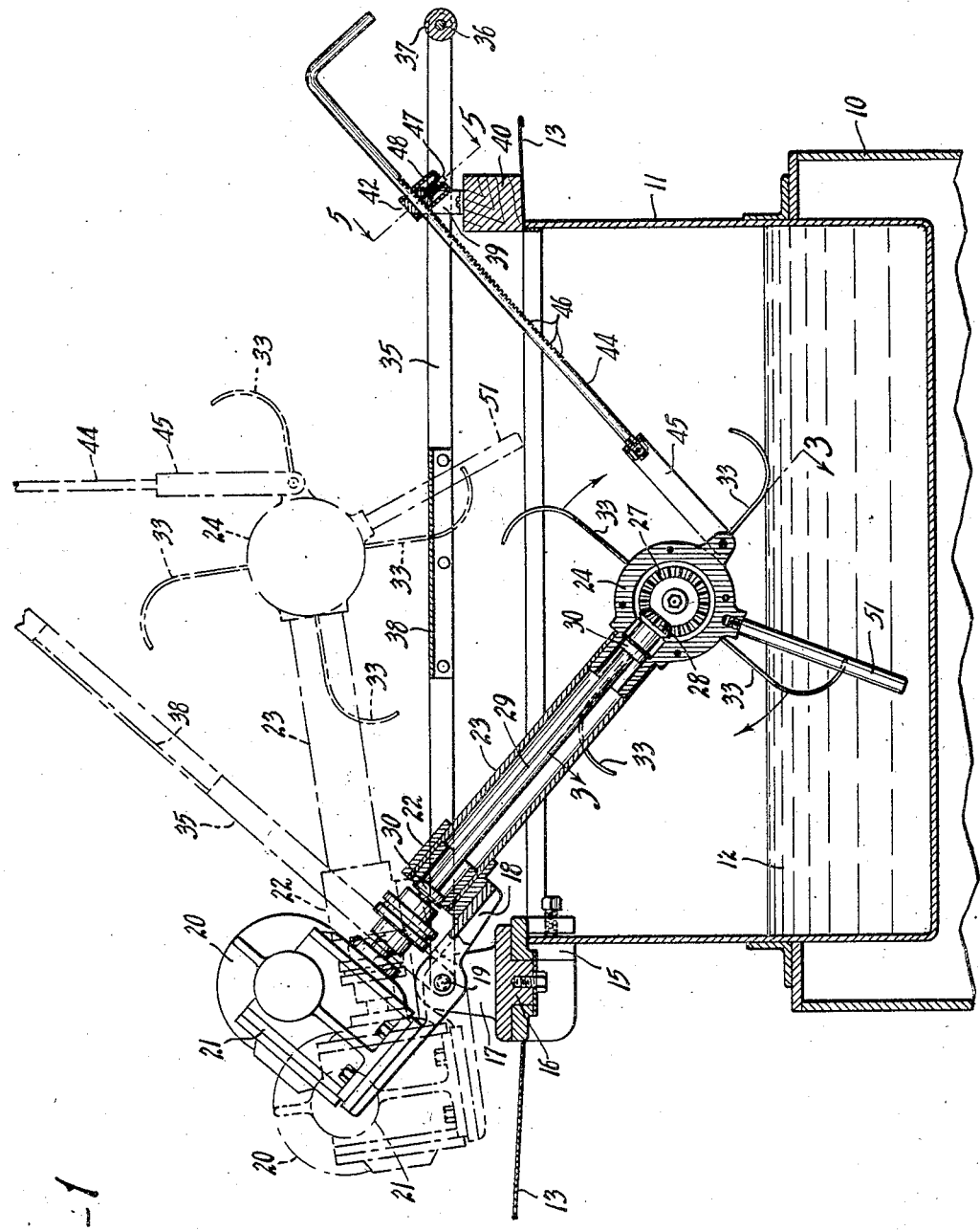
Fig. 1 is a vertical central sectional view of apparatus embodying the invention.

Referring to the drawings, there is shown a cooker comprising a burner compartment 10, and a kettle or vat 11 that is mounted in partly telescoped relation therewith, said compartment 10 including any suitable burner or heater (not shown) for applying heat to the kettle or vat 11 to maintain the cooking medium contained therein at the desired cooking temperature. The cooking medium may be lard or it may be any of the vegetable frying media available for the purpose, said cooking medium being shown at 12, Fig. 1. At the top of the vat 11 is a sheet metal table 13 that is folded over the upper margin of the vat, and slopes slightly upwardly therefrom in all directions so that any of the cooking liquid that drops onto the table will drain back into the vat.

Clamped upon the upper margin of the vat, at one side thereof, is a bearing bracket 15, and pivotally mounted thereon, on a vertical axis, is a swivel 16. The latter is formed with a pair of upstanding arms, such as the arm 17, Fig. 1, said arms between them carrying a supporting plate 18 that is pivotally supported thereby on a horizontal axis consisting of the pivot pin 19. On the side of the pivot 19 farthest from the vat 11 the supporting plate 18 has an electric motor 20 mounted thereon and also a speed reducing device 21 that is coupled to said motor. On the opposite side of the pivot 19 the supporting plate carries a bracket 22, and secured therein is one end of a hollow tube or sleeve 23. Secured to the free end of the latter is a closed gear case 24, the latter comprising a pair of axially aligned bearings 25, 25 for respective shafts 26 that project laterally from said gear case. The inner ends of the shafts 26, within the gear case 24, are provided with respective bevel gears 27, 27 of the same size, and the gears 27 are meshed with a single bevel pinion 28, on diametrically opposite sides of the latter, the arrangement being such that rotation of the pinion 28 will drive the gears 27, and shafts 26 connected thereto, concurrently in opposite directions. The pinion 28 is mounted upon the end of a shaft 29 that extends axially through the tube 23 suitable bearings 30, 30 being provided for said shaft adjacent the opposite ends thereof. At its end remote from the pinions 28 the shaft 29 is coupled to the speed reducing device 21, whereby the shafts 26 are adapted to be driven by the motor 20.

The shafts 26 carry the devices that stir the food products within the cooking medium 12 in vat 11, there being a plurality of such devices mounted in axially spaced relation upon each shaft 26. Each of said stirring devices comprises a hub structure 32 that is mounted for axial adjustment upon a shaft 26, each of said hub structures carrying a plurality, herein shown as four in number, of radially extending blades or paddles 33, 33. The paddles 33 are flat and relatively narrow, and their outer end portions are curved through an arc of about 90 degrees, the curvature being in the plane of the device. All of the paddles 33 located on one side of the gear case 24 are curved in one direction, and all of the paddles on the opposite side of the gear case are curved in the opposite direction. The curvature of the paddles is so related to the direction of rotation of the shafts 26 that when the stirrer is in operation and the shafts 26 are turning, the convex side of each paddle is the leading side. For operation, the apparatus is positioned with the shafts 26 somewhat above the liquid level of the cooking medium 12, so that only the arcuate end portions of the paddles 33 enter the cooking medium to agitate the food product therein. Since it is the convex sides of the paddles that engage the food product, the latter is gently agitated and turned, and fragile products are not broken or mashed.

Because of the pivotal mounting of the stirrer at 19, the free end thereof, including the paddles 33, may be adjusted up or down in accordance with the liquid level of the cooking medium 12, or the entire device may be elevated and swung about the vertical pivot of the swivel 16 to remove the stirrer from its position over the vat 11, upon occasion, such as when it is desired to remove the cooked product therefrom. To this end a pair of metal straps or bars 35, 35 are pivotally mounted upon the opposite ends of the pivot pin 19 and extend radially therefrom, the free ends of said bars being connected to each other by an elongated rivet 36, there being a cylindrical hand grip 37 mounted upon said rivet between said bars. In their medial region the bars 35 are connected by a transverse reinforcing plate 38, the arrangement being such that the bars 35 constitute a frame that is movable angularly about the pivots 19, relatively of the supporting plate 18 and elements carried thereby. Bolted to the respective bars 35 near the free ends thereof are angular brackets 39, 39, and secured to the lower ends of said brackets is a wooden block 40. When the frame is in horizontal position the block 40 rests upon the table 13, adjacent the edge of the vat 11, and thus constitutes a support for said frame.

The upper ends of the brackets 39 project above the bars 35 of the frame, and swiveled in the upper ends of said brackets, between the same, is a latch block 42 having a bore 43 extending transversely through its medial region. Slidably received in said bore 43 is an adjusting rod 44, one end of which is swivelly connected to a clevis 45 that is pivotally connected to the gear case 24. The other end of the rod 44 is bent at right angles to provide a suitable hand-grip portion. Intermediate its ends one side of the adjusting rod is formed with transverse grooves or notches 46, 46, and receivable in the latter is a spring-pressed detent 47 that extends through a suitable slot in the latch block 42, which slot opens into the bore 43 thereof. For guiding the detent 47, a stirrup-like strap or bracket 48 is carried by the block 42, there being a compression spring 49 mounted on the stem of the detent between a flange 50 thereon and the confronting wall of the bracket 48. The arrangement is such that the detent 47, by entering a notch 46 in the rod 44, prevents axial movement of the rod relatively of the latch block 42. Thus there is provided a means by which the angular position of the stirrer may be selectively adjusted relatively of the frame comprising the bars 35, thus enabling the stirrer to be determinately positioned with relation to the bevel of the cooking medium 12, whereby optimum results are obtained. When adjustment of the stirrer is desired, it is required only that the rod 44 be turned angularly on its axis until the notches 46 of the rod are out of alignment with the detent 47, thereby enabling the rod freely to slide in the bore of the latch block 42. Secured to the bottom side of the gear case 24 is a downwardly projecting leg 51 that extends beyond the path of movement of the paddles 33. The arrangement is such that in case of inadvertent or accidental release of the detent 47, descent of the stirrer into the vat will proceed only until the leg 51 strikes the bottom of the vat, and no damage will result to the paddles 33.

In the operation of the apparatus, the cooking medium in proper amount is heated to the proper temperature in the vat 11, after which the food product, such as potato chips in the raw state, and placed therein. The stirrer is then operatively positioned in the vat, in the position shown in full lines in Fig. 1 and Fig. 2, and the motor 20 put into operation to rotate the shafts 26 and the paddles 33 carried thereby, said paddles agitating the food product in the manner previously explained. Furthermore, because the paddles on one side of the gear case 24 rotate in the opposite direction with respect to the paddles on the opposite side of the gear case, there is imparted to the entire mass of cooking medium and food produce an orbital movement within the vat, as indicated by the arrow in Fig. 2. Such orbital movement, in combination with the agitation effected by the paddles, assure that the food units will be cooked on both sides, and that the cooking will be uniform throughout the entire mass of the food product.

When the cooking operation is completed and it is desired to remove the cooked food from the vat, the stirrer readily may be moved to an inoperative position. Thus, by grasping the hand grip 37 and elevating the free end of the frame of which said hand-grip is a part, the operator may tilt the stirrer on its pivot 19 until the leg 51 thereof is above the top of the table 13, as shown in broken lines in Fig. 1. Then by swinging said frame and stirrer as a unit angularly about the vertical axis of the swivel 16, the stirrer may be moved away from its position over the vat 11 to a position laterally thereof, over the table 13, as shown in broken lines in Fig. 2. In the latter position the leg 51 will support the free end of the stirrer with the paddles 33 out of contact with said table.

The invention provides a simple and efficient stirrer for food cookers, that will not break or mash the food units, that will effect uniformity of the cooked product, and which achieves the other objects set forth in the foregoing statement of objects.

Modification may be resorted to without departing from the spirit of the invention, or the scope thereof as defined by the appended claims.

What is claimed is:

1. A stirring device for food cookers, said device comprising a gear case positionable over the fluent cooking medium, respective shafts extending horizontally in opposite directions from said gear case, paddles extending radially from said shafts, and means for rotating said shafts about their own axes in opposite directions, the end portions of said paddles on one of said shafts being arcuately curved in one direction and the paddles on the other shaft being curved in the opposite direction.

2. A combination as defined in claim 1 wherein the paddles are so curved that their convex sides are foremost as they rotate with the shafts on which they are mounted.

3. A stirring device for food cookers comprising an elongated structure including paddles at one end thereof for agitating a cooking mixture in a vat and a motor at the other end of the structure for driving said paddles, means for pivotally mounting the structure on one side of the vat with the paddles disposed within the latter, and adjustable means connecting the paddle end of the structure with the opposite side of the vat for adjusting the elevation of the paddles with relation to the cooking medium in the vat.

4. A combination as defined in claim 2 wherein the means pivotally mounting the stirrer on the side of the vat comprises a swivel that is movable upon a vertical axis.

5. A stirrer for food cookers comprising an elongated structure having paddles at one end thereof and a motor at the other end thereof for driving said paddles, means comprising a pivot pin mounted upon the side of a cooking vat for pivotally supporting the structure at the motor end thereof on a horizontal axis, a frame also pivoted on the said pivot pin and extending across the vat with its free end at the opposite side of the latter, and adjusting means pivotally connected to the paddle end of the stirrer and to the frame adjacent the free end of the latter for adjusting the elevation of the paddles with relation to the cooking medium in the vat.

6. A combination as defined in claim 5 wherein the means that pivotally supports the stirrer and the frame on a horizontal pivot pin comprises a swivel that is rotatable about a vertical axis.

7. A stirrer for food cookers comprising an elongated structure having paddles at one end thereof and a motor at the other end thereof for driving said paddles, means attachable to the side of a cooking vat for pivotally supporting the structure at the motor end thereof on a horizontal axis, a frame pivoted on the same axis as said structure and extending across the vat with its free end resting at the opposite side of the latter, an adjusting rod pivotally connected at one end to the paddle end of the stirrer, and means on the frame adjacent the free end thereof engaging said rod and retaining it in various positions of longitudinal adjustment for controlling the elevation of the paddles with relation to the level of the cooking medium in the vat.

8. A combination as defined in claim 7 wherein the last mentioned means comprises a latch block pivotally mounted on the frame and guiding the adjusting rod, and a spring-pressed detent carried by the latch block and engageable with notches formed in the adjusting rod.

9. A stirrer for food cookers comprising an elongated structure having paddles at one end thereof and a motor at the other end thereof for driving said paddles, means attachable to the side of a cooking vat for pivotally supporting the structure at the motor end thereof on a horizontal axis, a frame pivoted on the same axis as said structure and extending across the vat with its free end resting at the opposite side of the latter, a clevis pivotally connected to the paddle end of the stirrer, an adjusting rod swivelly connected at one end to said stirrer, a latch block pivotally carried by the frame and formed with a transverse bore through which the adjusting rod slidably and rotatably extends, and a spring pressed detent carried by said latch block and engageable with notches formed on one side of said rod, said rod being rotatable to move said notches out of alignment with said detent and thereby to enable longitudinal movement of the rod relatively of the detent.

10. A combination as defined in claim 9 including a leg projecting from the paddle end of the stirrer and constituting a rest for the free end of the latter to prevent damage to the paddles.

GUY R. TYLER.

CERTIFICATE OF CORRECTION.

Patent No. 2,311,586. February 16, 1943.

GUY R. TYLER.

It is hereby certified that error appears in the printed specification of the above numbered patent requiring correction as follows: Page 3, first column, line 3, for "in claim 2" read --in claim 3--; and that the said Letters Patent should be read with this correction therein that the same may conform to the record of the case in the Patent Office.

Signed and sealed this 27th day of April, A. D. 1943.

(Seal)

Henry Van Arsdale,
Acting Commissioner of Patents.